Dec. 29, 1925.  1,567,496
J. J. FITZGERALD
DRAG LINE SCRAPER
Filed Sept. 1, 1925   2 Sheets-Sheet 1
Fig. 1.
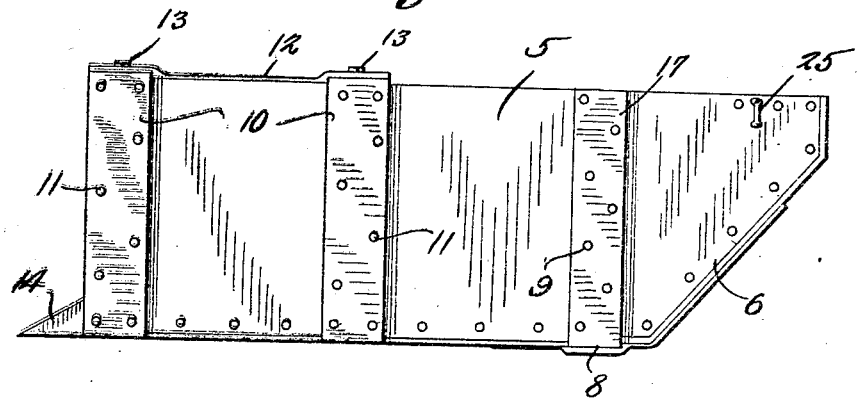
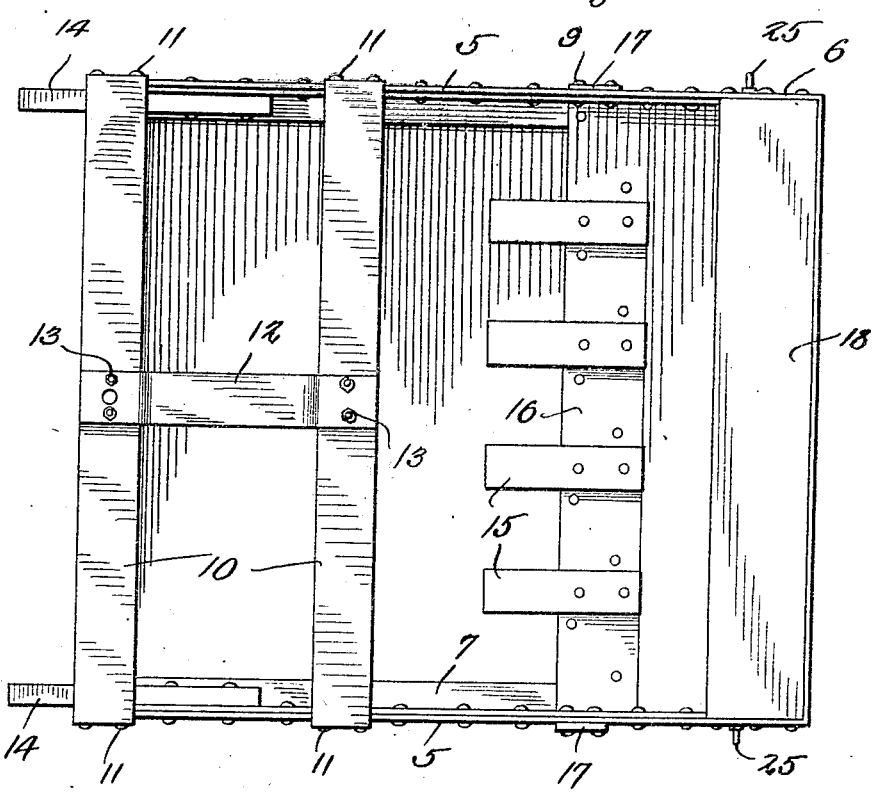
Fig. 2.
J. J. Fitzgerald
Inventor Dec. 29, 1925.  1,567,496
J. J. FITZGERALD
DRAG LINE SCRAPER
Filed Sept. 1, 1925  2 Sheets-Sheet 2

J. J. Fitzgerald
Inventor
By C. A. Snow & Co.
Attorneys.

Patented Dec. 29, 1925.

1,567,496

UNITED STATES PATENT OFFICE.

JOHN J. FITZGERALD, OF STAPLETON, NEW YORK.

DRAG-LINE SCRAPER.

Application filed September 1, 1925. Serial No. 53,883.

*To all whom it may concern:*

Be it known that I, JOHN J. FITZGERALD, a citizen of the United States, residing at Stapleton, in the county of Richmond and State of New York, have invented a new and useful Drag-Line Scraper, of which the following is a specification.

This invention relates to drag line scrapers employed in excavating and aims to provide a novel form of excavator which will be exceptionally strong and durable, and one which may operate to accomplish its purpose with facility.

An important object of the invention is to provide a scraper including lateral blades or teeth disposed adjacent to the forward end of the scraper, and teeth arranged adjacent to the rear end of the scraper, the teeth at the forward end of the scraper acting to guide the scraper into the soil of the surface being scraped.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a scraper constructed in accordance with the invention.

Figure 2 is a plan view thereof.

Figure 3:
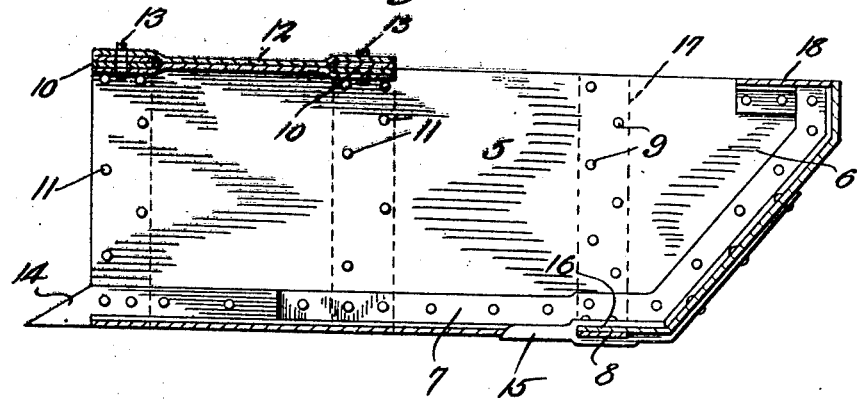
Figure 3 is a longitudinal sectional view through the scraper.

Referring to the drawings in detail, the scraper includes side walls 5 which have upwardly extended rear end portions 6.

Angle bars indicated at 7 are bolted to the lower edges of the side members 5 and provide a support for the transversely extending bracing bar 8 that has its ends bolted to the side walls 5.

Inverted U-shaped bracing members 10 extend over the upper edges of the side members 5 of the scraper, the ends thereof being bolted to the side members 5 by means of bolts 11, thereby holding the side members of the scraper in proper spaced relation with each other at all times.

Spacing members 12 are provided and as shown, have their ends offset to permit them to be positioned over the inverted U-shaped members 10 as clearly shown by Figure 3 of the drawing, the members 12 being bolted thereto as at 13. The scraper is guided by the teeth 14 that have their cutting edges extended beyond the forward inverted U-shaped member 10 as shown by Figures 1 and 2 of the drawings, and these teeth 14 are provided with cut out portions to permit them to be positioned over the supporting flange or angle bar forming a part of the scraper.

Thus it will be seen that these teeth will be directed into the soil being scraped, and will act to guide the scraper to its work.

The reference character 15 indicates teeth which are provided with cut out portions to permit them to be secured to the transversely extended bar 8 which in turn is secured to the lower front edge of the rear wall 16 forming a part of the scraper. These teeth 15 are arranged in spaced relation with each other to accomplish the scraping result throughout the width of the scraper.

The bar 8 has upwardly extended end portions 17 that are bolted to the side walls of the scraper at 9, bracing the side walls of the scraper at points adjacent to the rear end thereof. In order that material will be prevented from passing from the scraper over the rear wall thereof, the rear wall is provided with an inwardly extended upper portion 18, closing the extreme rear end of the scraper as shown by Figure 2.

Figure 4:
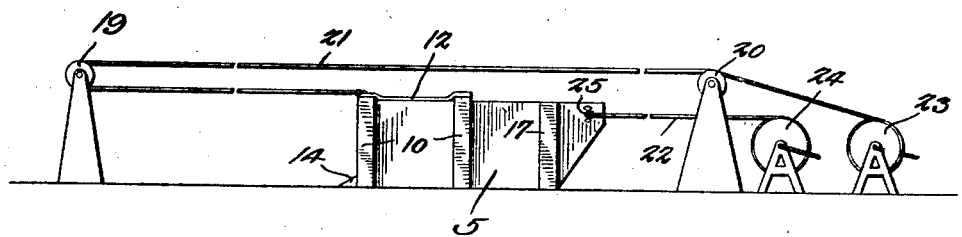
Figure 4 is a diagrammatic view illustrating the manner of operating the scraper.

As shown by Figure 4 of the drawings, the scraper is designed to operate between pulleys which are indicated at 19 and 20, there being provided cables 21 and 22, the cable 21 operating over pulleys 20 and 21 and being wound on the drum 23 so that the scraper may be moved in one direction, while the cable 22 has connection with the rear of the scraper and operates over the drum 24 so that the scraper may be returned to its initial position.

Eye bolts 25 are provided at the rear of the scraper affording means for connecting the cable 22 to the scraper.

I claim:—

1. A scraper comprising a body portion including angle bars, side members secured to the angle bars, inverted U-shaped members secured to the side members, means for holding the inverted U-shaped members in spaced relation with each other, teeth secured to the forward ends of the angle bars, and a wall for closing the rear end of the body portion.

2. A scraper comprising a body portion, angle bars forming a part of the body portion, side plates secured to the angle bars, inverted U-shaped members positioned over the upper edges of the side plates and secured to the side plates, teeth secured to the forward ends of the angle bars, a U-shaped bar secured at the rear of the body portion, teeth having cut out portions and adapted to be fitted over the last mentioned bar, and a rear plate secured to the body portion.

3. A scraper comprising a body portion, angle bars having upwardly extended rear end portions forming a part of the body portion, side plates secured to the angle bars, a rear plate secured to the angle bars, said rear plate having an inwardly extending upper extremity adapted to close the rear of the body portion, teeth secured to the forward ends of the angle bars, and teeth secured within the body portion at a point adjacent to the rear end thereof.

4. A scraper comprising a body portion, said body portion including angle bars, side plates secured to the angle bars, bars embracing portions of the side plates for holding the side plates in spaced relation with each other, means for holding the last mentioned bars in spaced relation with each other, the bottom of said scraper being open throughout a portion of its length, and teeth carried by the body portion.

5. A scraper comprising a body portion, said body portion including lateral angle bars, arranged in spaced relation with each other, side plates having connection with the angle bars, means embracing portions of the side plates for holding the side plates in vertical positions, a rear wall connected with the angle bars, said rear wall having an inwardly extended upper portion adapted to close the upper portion of the scraper, and teeth carried by the body portion.

In testimony that I claim the foregoing as my own, I have hereto affixed my signature.

JOHN J. FITZGERALD.